(12) United States Patent
Yamauchi et al.

(10) Patent No.: US 6,235,963 B1
(45) Date of Patent: May 22, 2001

(54) METHOD FOR DECOMPOSING PCB

(75) Inventors: Yasuhiro Yamauchi; Kan Ogata; Naoki Shindo; Nobuhiro Hokao; Yoshihiko Tsuchiyama; Masakazu Tateishi; Tadatsugu Fukuzumi, all of Nagasaki (JP)

(73) Assignee: Mitsubishi Heavy Industrials, Ltd., Tokyo (JP)

( * ) Notice: Subject to any disclaimer, the term of this patent is extended or adjusted under 35 U.S.C. 154(b) by 0 days.

(21) Appl. No.: 09/060,281

(22) Filed: Apr. 14, 1998

(30) Foreign Application Priority Data

Apr. 15, 1997 (JP) .............................................. 9-6306
Mar. 3, 1998 (JP) .............................................. 10-050350

(51) Int. Cl.[7] .................................................. A62D 3/00
(52) U.S. Cl. ...................... 588/205; 588/206; 588/207; 588/208; 588/218; 588/226; 588/239
(58) Field of Search .................................. 588/208, 218, 588/226, 239, 205, 206, 207; 423/563; 210/759, 760, 761

(56) References Cited

U.S. PATENT DOCUMENTS

| | | | |
|---|---|---|---|
| 4,714,032 | 12/1987 | Dickinson | 110/347 |
| 4,783,263 | * 11/1988 | Trost et al. | 210/638 |
| 5,232,604 | 8/1993 | Swallow et al. | 210/759 |
| 5,324,439 | 6/1994 | Chen et al. | 210/761 |
| 5,744,117 | * 4/1998 | Wilkenson et al. | 423/563 |
| 5,746,926 | * 5/1998 | Ross et al. | 210/761 |
| 5,755,974 | 5/1998 | McBrayer, Jr. et al. | 210/739 |
| 5,837,149 | * 11/1998 | Ross et al. | 210/759 |

FOREIGN PATENT DOCUMENTS

2458955 * 6/1975 (DE) ..................................... 423/556

OTHER PUBLICATIONS

Felder et al., Elementary Principles of Chemical Processes, p. 106, 1978.*
Perry, Chemical Engineers' Handbook, 5th Edition, pp. 20–81 & 20–82, 1973.*
D. S. Ross et al., "Assisted Hydrothermal Oxidation — A Proposed On–Site Disposal Technology for Halogenated Waste," The Second International Conference on Solvothermal Reactions, Dec. 18–20, 1996.
D. S. Ross et al., "Hydrothermal Oxidative Pyrolysis on Reactive Surfaces," International Symposium on Solvothermal & Hydrothermal Processes, Sep. 1–3, 1997.

* cited by examiner

Primary Examiner—Steven P. Griffin
Assistant Examiner—Eileen E. Nave
(74) Attorney, Agent, or Firm—Myers Bigel Sibley & Sajovec

(57) ABSTRACT

The present invention provides a PCB decomposing apparatus capable of decomposing PCB efficiently. The PCB decomposing apparatus comprises a PCB extracting container for extracting PCB from a PCB-containing material with an organic solvent. A distilling tower provided on the downstream side of the PCB extracting container distills the organic solvent to separate the PCB. A primary reactor provided on the downstream side of the distilling tower includes a nozzle for supplying aqueous $Na_2CO_3$ solution and a nozzle for supplying an oxidizing agent into the container. A liquid cyclone provided on the downstream side of the primary reactor can remove $Na_2CO_3$ having a large particle size. A secondary reactor formed by a long pipe is connected to the liquid cyclone. A gas-liquid separator provided on the further downstream side of the secondary reactor can separate a gas from a solution. A film separator separates treated water into purified water and a concentrated solution, and the purified water is supplied as circulating water to the upstream side of a pressure pump.

13 Claims, 10 Drawing Sheets

FIG. I

METHOD FOR DECOMPOSING PCB

BACKGROUND OF THE INVENTION AND RELATED ART STATEMENT

1. Field of the Invention

The present invention relates to a method and apparatus for decomposing organic fats and oils containing PCB (polychloro biphenyl) and for making them innoxious, and more particularly to a PCB decomposing method and apparatus in which PCB is mixed with water, an oxidizing agent and sodium carbonate, and decomposed under pressure at an elevated temperature.

2. Description of Related Art

Conventionally, several PCB decomposing methods have been known and their practical use has been studied by electric power companies, various manufactures and the like. However, only a few PCB decomposing methods have been completed and put to use for actual PCB decomposition treatments.

FIG. 10 shows a structure of a conventional PCB decomposing apparatus. In this PCB decomposing apparatus, a material to be treated which is contained in a transformer or the like is put in PCB extracting container 1. An organic solvent is fed from distilling tower 2 into the PCB extracting container 1 through transfer pump 4, and PCB is extracted with the organic solvent. The PCB extracted in the PCB extracting container 1 and the organic solvent are fed to the distilling column 2 through the transfer pump 3. In the distilling column 2, the organic solvent is distilled to separate the PCB. Then, the PCB circulates into the PCB extracting container 1 through the transfer pump 4.

The PCB extracted in the distilling tower 2 is mixed with water 10, aqueous hydrogen peroxide 11 and aqueous $Na_2CO_3$ solution 12. Then, the mixed water is pressurized to 250 ata by means of pressure pump 13 and passes through cooler 161 to be heated by the generated in reactor 16.

The mixed water containing the PCB cools the reactor 16, while the water mixture being heated to 300° C., and enters the reactor 16 through start-up heater 15. In the reactor 16, reaction occurs after a residence time necessary for decomposition of the PCB. This reaction is exothermic. In order to keep the temperature at 380° C., the reactor 16 is cooled by the cooler 161.

A reacted solution discharged from the reactor 16 is cooled to a temperature of 100° C. or less by cooler 17. The deposited $Na_2CO_3$ is remelted. A pressure of the reacted solution is reduced to an atmospheric pressure by pressure reducing valve 18, and the solution is separated into $CO_2$ and steam 20, and treated water 22 in steam separator or gas-liquid separator 21.

Exothermic reaction is carried out in the reactor 16 as expressed by the formula shown below.

PCB and solid $Na_2CO_3$ deposited upon heating react as shown in Formula (1) so that biphenyl, $CO_2$ and NaCl are produced. The biphenyl further reacts with aqueous hydrogen peroxide solution so that $CO_2$ and $H_2O$ are produced as shown in Formula (2).

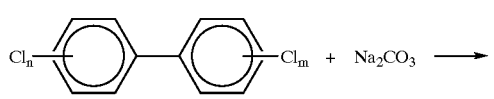

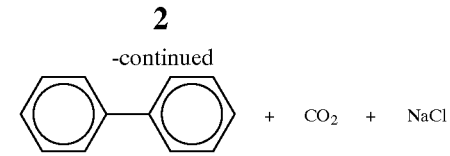

Formula

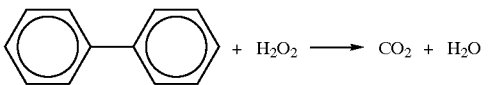

(2)

In the reactor 16, a pipe is formed like a coil to increase a length thereof. Consequently, the residence time of the PCB in the reactor 16 is increased so that the PCB can sufficiently react, and its concentration can be reduced to the order of ppb (parts per billion).

OBJECT AND SUMMARY OF THE INVENTION

In such a reactor of a pipe type, a solid deposited by $Na_2CO_3$ and PCB are not sufficiently stirred and a reaction rate tends to be low. Although the $Na_2CO_3$ is deposited by heating, a pipe is heated by a heater. Therefore, the $Na_2CO_3$ is deposited in the vicinity of an inside wall of the pipe. For this reason, the $Na_2CO_3$ sticks to the wall of the heated pipe. As a result, a heat transfer rate is reduced so that decomposition of the PCB is hindered. Furthermore, most of the reacted solution is water. Therefore, a large amount of water has to be treated, and an amount of water to be supplied is also large.

In consideration of the above-mentioned problems, it is an object of the present invention to provide a method and apparatus for decomposing PCB capable of sufficiently stirring $Na_2CO_3$ and PCB and efficiently decomposing the PCB.

In order to attain the above-mentioned object, the present invention provides a PCB decomposing method comprising the steps of pressurizing PCB mixed with water to a predetermined pressure and heating the mixture, and then introducing the mixture into a container-shaped primary reactor, introducing aqueous $Na_2CO_3$ solution for PCB decomposition and blowing an oxidizing agent through a nozzle into the primary reactor, stirring the deposited $Na_2CO_3$ with the PCB by blowing of the nozzle to decompose the PCB into biphenyl containing no chlorine and NaCl, causing the biphenyl to react to the oxidizing agent, thereby decomposing the biphenyl into carbon dioxide and water, causing a fluid containing unreacted PCB to flow into a bent pipe in a secondary reactor, so as to increase a residence time of the fluid in the secondary reactor for a longer reaction time for the PCB and the $Na_2CO_3$, thereby promoting the decomposition of the PCB.

The present invention further provides a PCB decomposing apparatus comprising: a PCB extracting container for extracting PCB from a PCB-containing material with an organic solvent; a distilling tower for distilling an extracted solution introduced from the PCB extracting container, thereby separating the PCB from the organic solvent; a primary reactor including a container for receiving a PCB-containing fluid separated in the distilling tower, a nozzle for introducing aqueous sodium carbonate solution into the container for decomposing the PCB, and a nozzle for introducing an oxidizing agent; a secondary reactor having a conduit bent to increase a moving distance of the fluid and serving to further decompose unreacted PCB contained in the fluid introduced from the primary reactor in the conduit;

and a gas-liquid separator for separating, from the fluid, carbon dioxide contained in the fluid introduced from the secondary reactor by reducing an internal pressure.

The PCB is mixed with water, and the mixture is pressurized to a predetermined pressure and preheated. The mixture is then introduced into the primary reactor. The primary reactor is formed by a container including a cooler instead of a conventional pipe. The heated mixture of PCB and water is introduced into the primary reactor, and an oxidizing agent, such as air, oxygen or the like, and aqueous $Na_2CO_3$ solution are injected into the primary reactor through the nozzle. Thus, mixing and reaction are carried out in the primary reactor.

The $Na_2CO_3$ deposited in the container and the PCB are stirred by jetting, through the nozzle, the oxidizing agent and the circulating water fetched from the container.

Chlorine molecules of the PCB react on surfaces of $Na_2CO_3$ particles deposited or precipitated with increased reaction temperatures. Consequently, the PCB is decomposed into NaCl and a biphenyl which does not substantially contain chlorine. Furthermore, the biphenyl reacts to the oxidizing agent and is decomposed into carbon dioxide and water. Much of the reaction between the $Na_2CO_3$ and PCB is solid-liquid reaction. Therefore, the reactor is fluidized by the circulating water so that a reaction rate can be increased.

From the solution flowing out of the primary reactor is removed the deposited or precipitated $Na_2CO_3$ having a large particle size by the liquid cyclone. Then, the solution is caused to react as it passes through the secondary reactor formed by a long pipe.

The secondary reactor formed by the pipe decomposes the PCB up to a ppb level. The treated water obtained after the reaction is concentrated by the film separator. The separated water is mixed with the PCB.

DETAILED DESCRIPTION OF PREFERRED EMBODIMENTS

Figure 1:
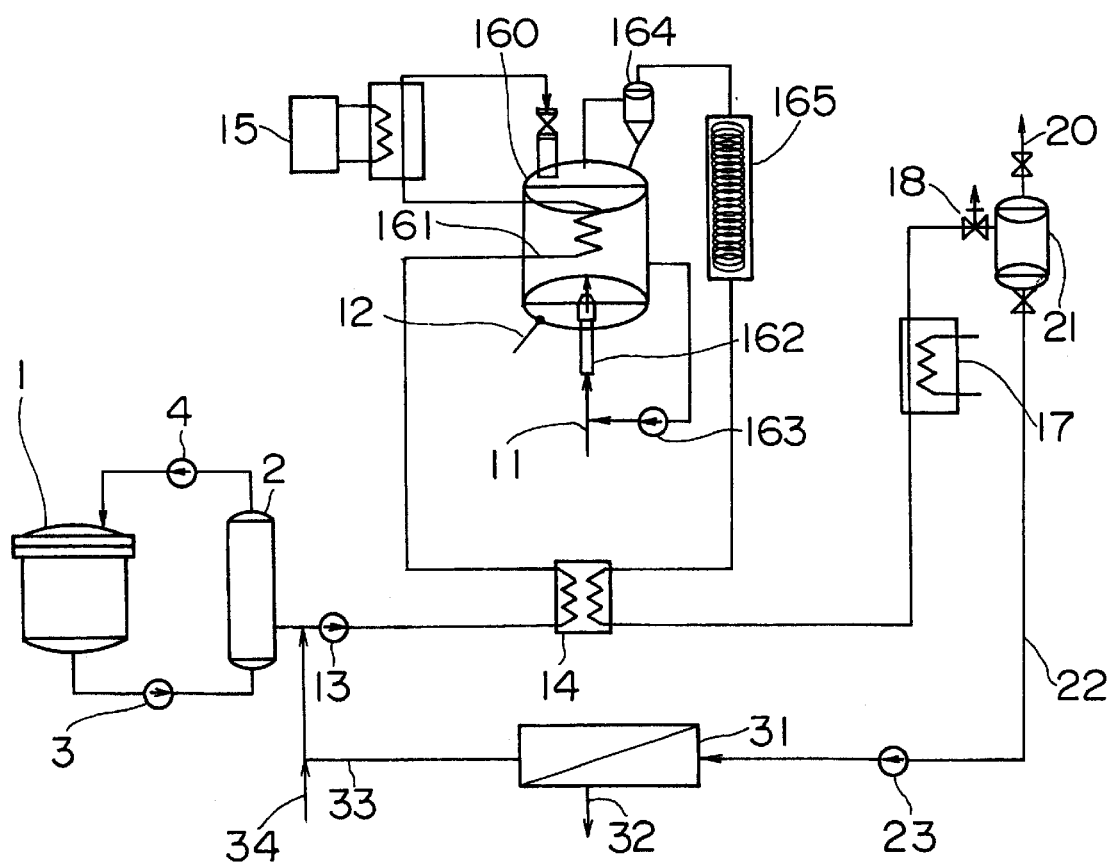
FIG. 1 is a system diagram showing a PCB decomposing apparatus according to a first embodiment of the present invention.

A PCB decomposing method and apparatus according to a first embodiment of the present invention will be described below with reference to FIG. 1.

A PCB decomposing apparatus has PCB extracting container 1 provided on the upstream side. The PCB extracting container 1 serves to extract PCB with an organic solvent from a PCB-containing material. Distilling tower 2 is connected to the downstream side of the PCB extracting container 1 through transfer pump 3. The distilling tower 2 can distill PCB and the organic solvent to separate the PCB, and can supply the distilled organic solvent to the PCB extracting container 1 through transfer pump 4.

Pressure pump 13 for feeding PCB and water to heat exchanger 14 under pressure, the heat exchanger 14, and cooler 161 are provided on the downstream side of the distilling tower 2. In the cooler 161, a conduit through which PCB mixed with water flows is introduced to cool the inside of primary reactor 160. A fluid flowing through the conduit absorbs heat of the primary reactor 160. The cooler 161 is connected to start-up heater 15 through the conduit, and the primary reactor 160 is provided on the downstream side of the start-up heater 15.

The primary reactor 160 is provided with a nozzle for supplying aqueous $Na_2CO_3$ solution 12 into the container and a nozzle 162 for supplying oxidizing agent 11, such as air or oxygen. Circulating pump 163 is provided between a conduit for supplying the oxidizing agent 11 and the primary reactor 160. The circulating pump 163 mixes the fluid in the primary reactor 160 with the oxidizing agent 11, and returns the mixture into the primary reactor 160 again. Liquid cyclone 164 is provided on the downstream side of the primary reactor 160, and serves to separate deposited $Na_2CO_3$ having a large particle size and prevent the $Na_2CO_3$ from flowing to the downstream side.

On the downstream side of the liquid cyclone 164 provided is secondary reactor 165 having a bent pipe for increasing the residence time of a fluid. Gas-liquid separator 21 is connected to the further downstream side of the secondary reactor 165 through the heat exchanger 14, the cooler 17 and the pressure reducing valve 18. The heat exchanger 14 exchanges heat of a fluid in the conduit provided between the distilling tower 2 and the cooler 161 for that of a fluid in the conduit provided between the secondary reactor 165 and the cooler 17. The gas-liquid separator 21 can receive a solution having a pressure reduced to an atmospheric pressure by means of the pressure reducing valve 18, and separate a gas from the solution. Treated water 22 in the gas-liquid separator 21 is supplied through pressure pump 23 to film separator 31 provided on the downstream side. The film separator 31 serves to separate the treated water 22 into purified water and concentrated solution 32. The purified water is supplied as circulating water 33 to the upstream side of the pressure pump 13, and the solution 32 containing concentrated components is discharged to the outside.

The function of the PCB decomposing apparatus will be described below.

A material to be treated which is contained in a transformer or the like is put in the PCB extracting container 1, and an organic solvent is fed from the distilling tower 2 through the transfer pump 4 to extract PCB in the PCB extracting container 1. The PCB extracted in the PCB extracting container 1 and the organic solvent are fed to the distilling tower 2 through the transfer pump 3, and the organic solvent is distilled and separated from the PCB. The distilled organic solvent circulates into the PCB extracting container 1 through the transfer pump 4 and is used as an extraction solution again. The extracted PCB is mixed with the circulating water 33 and water 34 to be supplied, and a pressure is applied to the mixture to 220 ata by means of the pressure pump 13. Then, heat of the mixture is exchanged for that of the fluid discharged from the secondary reactor 165 by means of the heat exchanger 14, and the primary reactor 160 is cooled by the cooler 161. Thereafter, the mixture is heated to a temperature of about 300° C. through the start-up heater 15, and is supplied into the primary reactor 160.

In the primary reactor 160, the circulating water obtained by mixing the $Na_2CO_3$ solution 12 and the oxidizing agent 11 is introduced into the primary reactor 160, and the oxidizing agent 11 and the circulating water are jetted from the nozzle 162 for stirring the inside of the primary reactor 160. Since exothermic reaction is carried out, a temperature reaches 380° C. or higher. The primary reactor 160 in which heat is generated is cooled by the cooler 161, and is kept at a temperature necessary for the reaction, for example, about 380 to 400° C.

The liquid cyclone 164 separates $Na_2CO_3$ having a large particle size from the fluid, and then supplies $Na_2CO_3$ particulates necessary for the reaction of the PCB to reach a concentration of ppb order.

The fluid discharged from the secondary reactor 165 is cooled to a temperature of 100° C. or less by the cooler 17, and deposited $Na_2CO_3$ is remelted. A pressure of the fluid is reduced to an atmospheric pressure by means of the pressure reducing valve 18, and is separated into $CO_2$, steam 20 and the treated water 22 by means of the gas-liquid separator 21. The treated water 22 is pressurized to 2 to 10 ata by means of the pressure pump 23, and is then supplied to the film separator 31 and is separated into the concentrated solution 32 and the circulating water 33 through an exchange film provided in the film separator 31. The circulating water 33 is returned to the downstream side of the distilling tower 2 and is mixed with the PCB.

Figure 10:
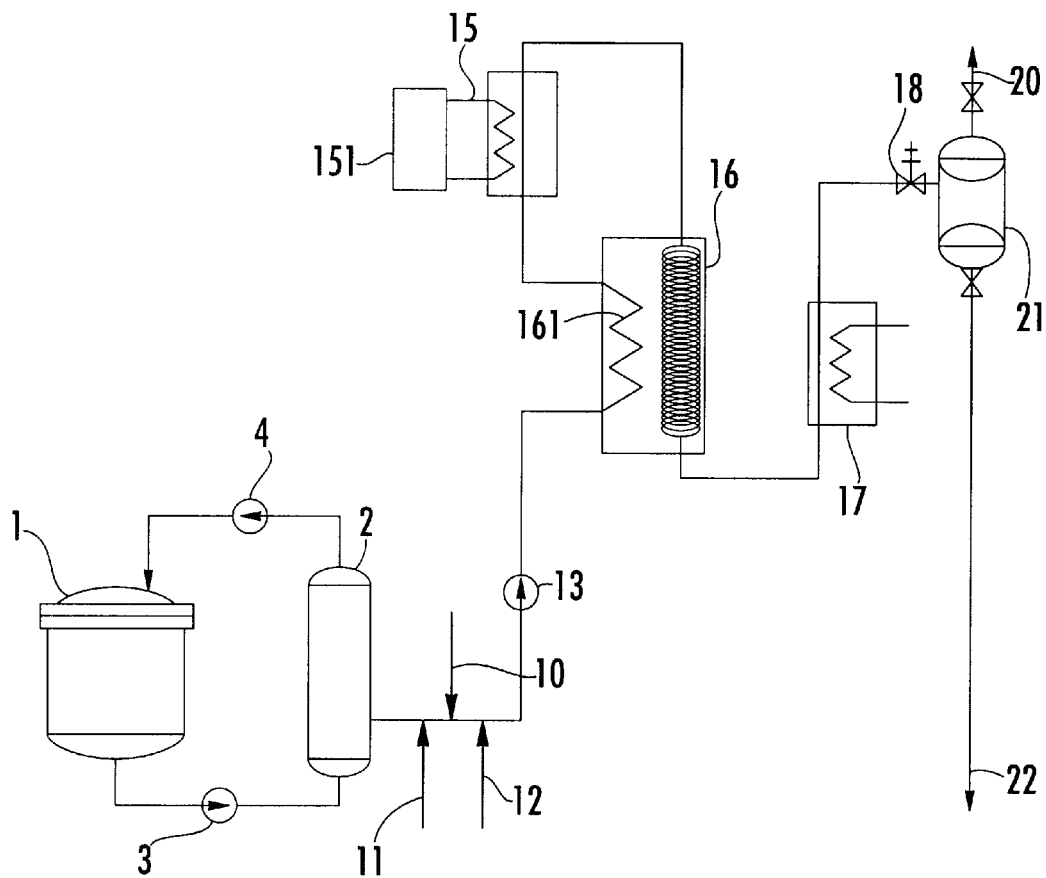
FIG. 10 is a system diagram showing a PCB decomposing apparatus according to the prior art.

According to the present embodiment described above, the primary reactor 160 is not formed by the conventionally simple pipe shown in FIG. 10 but by the container shown in FIG. 1. Consequently, $Na_2CO_3$ is deposited in the solution in the primary reactor 160 and does not stick to the heated pipe. Thus, less $Na_2CO_3$ sticks to a wall of the heated pipe. The circulating water and the oxidizing agent are blown off through the nozzle 162 provided on the primary reactor 160 to stir the inside of the primary reactor 160. Consequently, contact of the deposited $Na_2CO_3$ with the PCB is promoted so that a reaction rate is increased. In a case where PCB having a concentration of several % is to be treated, the reaction can be carried out to reach an order of ppm in the primary reactor 160 and an order of ppb in the secondary reactor 165.

The liquid cyclone 164 separates the $Na_2CO_3$ having a large particle size so that the secondary reactor 165 can be prevented from being blocked.

The circulating water is purified by the film separator 31 and the separated purified water recirculates.

Consequently, an amount of the water 34 to be supplied can be reduced economically.

A structure of a PCB decomposing apparatus according to a second embodiment of the present invention will be described below with reference to the drawings.

Figure 2:
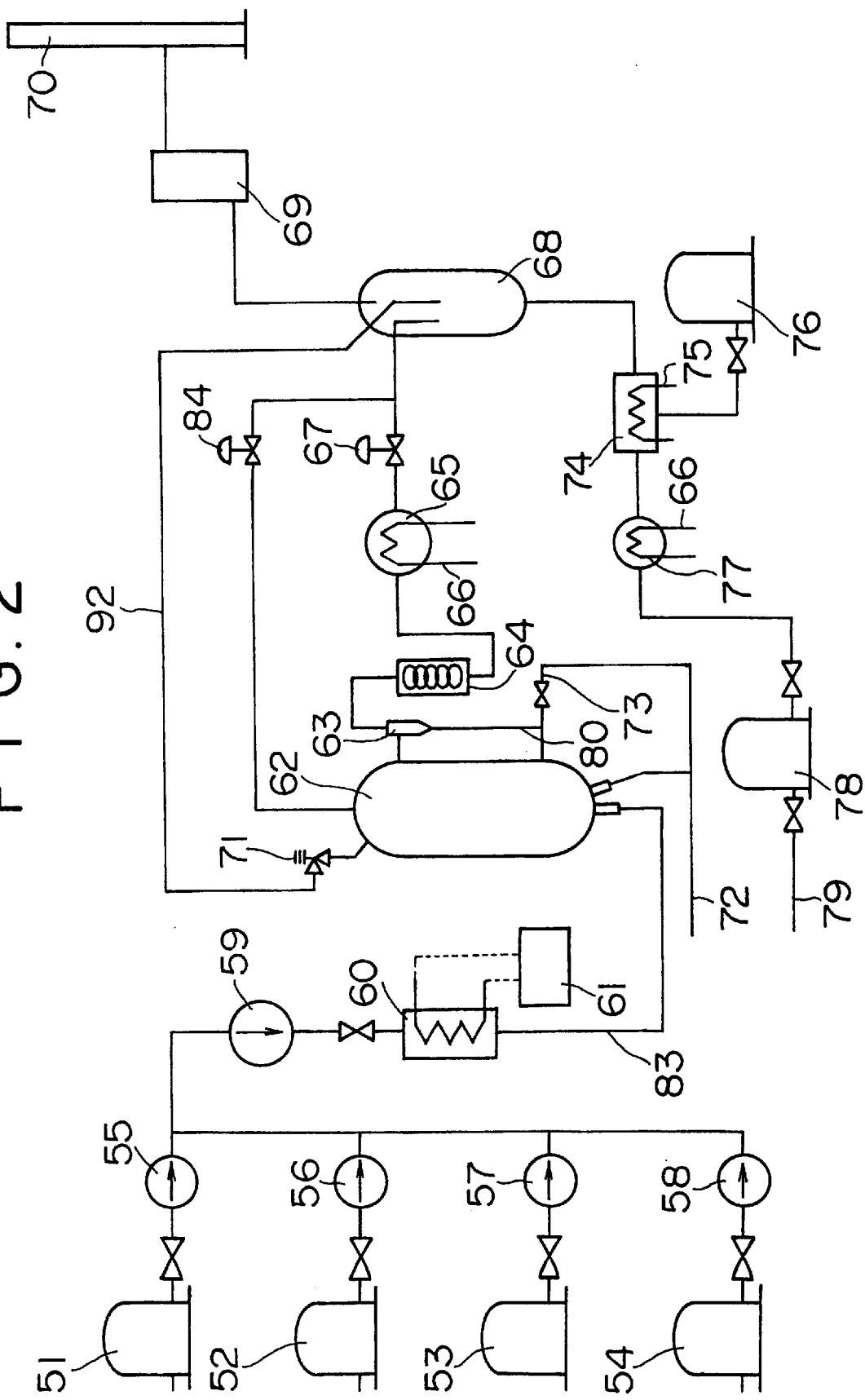
FIG. 2 is a system diagram showing a PCB decomposing apparatus according to a second embodiment of the present invention.

As shown in FIG. 2, PCB storage tank 51, aqueous sodium carbonate tank 52, water tank 53 and solvent tank 54 are provided in parallel on the upstream side of the PCB decomposing apparatus.

Transformer oil mixed with PCB or the like is stored in the PCB storage tank 51. Transfer pumps 55 to 58 are connected to the tanks 51 to 54, respectively, and their conduits join on the downstream side and are connected to transfer pump 59 for a PCB treated solution. The pump 59 has the function of a high pressure pump in such a manner that a pressure of a high pressure portion can be kept for PCB decomposing reaction performed by a primary reactor 62, a secondary reactor 64 and the like which are provided on the downstream side.

The pump 59 is connected to start-up heater 60. Power unit 61 is provided on the heater 60. In order to easily regulate the output, the power unit 61 employs electric heating in the present embodiment.

The heater 60 is connected to the primary reactor 62 through treated solution supply pipe 83. The primary reactor 62 is formed by a container which can correspond to a high temperature and a high pressure during PCB decomposing reaction, and is provided with safety valve 71 for protecting the container. Discharge line 92 provided on the safety valve 71 is connected to discharge tank 68 provided on the downstream side. Pipe 72 and drive gas pipe 73 are connected to the primary reactor 62. The pipe 72 is connected to an oxidizing agent supplying section of common means. The pipe 72 also communicates with the drive gas pipe 73. Pure oxygen, air and oxygen rich air (a gas having an oxygen concentration increased in the air) can be used for a drive gas.

Cyclone 63 is provided on a discharge port of the primary reactor 62, and serves to separate sodium carbonate having a large particle size which is discharged from the primary reactor 62 and to return the sodium carbonate to the primary reactor 62 through circulating line 80.

The secondary reactor 64 is provided on the downstream side of the cyclone 63. The secondary reactor 64 has a spiral shape and a greater pipe length to get a piping structure capable of keeping the residence time of PCB and sodium carbonate in order to promote their chemical reaction.

The discharge tank 68 is provided on the downstream side of the secondary reactor 64 through cooler 65 and pressure control (pressure reducing) valve 67.

The discharge tank 68 has a structure in which a gas and a liquid can be separated from each other. A gas stored in an upper portion of the container is discharged from exhaust tower 70 through adsorbing vessel 69 provided on the downstream side. A treated liquid which is stored in a bottom portion is discharged to drainage concentrator 74 provided on the downstream side. The drainage concentrator 74 heats and evaporates the treated water by means of heat source 75 using any of known electric heating or steam heating techniques so that the water containing concentrated components and the evaporated water can be separated from each other. Treated solution tank 76 and cooler 77 are provided on the downstream side of the drainage concentrator 74. The treated solution tank 76 is divided into two systems and serves to store the water with concentrated components. The cooler 77 introduces the evaporated water. Cooled water 66 is supplied to the cooler 77. Collected water tank 78 is connected to the downstream side of the cooler 77, and is connected to the water tank 53 through return water pipe 79.

The function of the PCB decomposing apparatus according to the second embodiment of the present invention will be described below.

Each solution stored in the PCB storage tank 51, the aqueous sodium carbonate tank 52, the water tank 53 and the like is regulated to have a predetermined flow rate by means of the respective transfer pumps 55 to 58, and is then supplied to the start-up heater 60 through the transfer pump 59.

In the start-up heater 60, the treated solution is preheated until heat to be required can be generated by PCB decomposing reaction (exothermic reaction) in the primary reactor 62, and the excess and deficiency of the heat of the system obtained with a change of reaction is regulated during operation of the PCB decomposing apparatus.

The treated solution is supplied through the pipe 83 to the primary reactor 62 by means of a treated solution jet nozzle (a well-known jet nozzle) fixed to a lower portion of the primary reactor 62. An oxidizing agent is supplied to the primary reactor 62 by means of an oxidizing agent jet nozzle fixed to the lower portion thereof. Air or oxygen is used for the oxidizing agent, and well-known supply equipment is utilized.

In the primary reactor 62 kept at a high temperature and pressure, sodium carbonate dissolved in the treated solution is deposited due to a difference in a solubility which is obtained depending on a temperature, and the deposited sodium carbonate reacts to PCB and is finally decomposed into NaCl, carbon dioxide and water, thereby becoming innoxious. In this case, the treated solution and the oxidizing agent are jetted through the nozzle in the primary reactor 62. Consequently, stirring and fluidization of the treated solution and the oxidizing agent are promoted in the container. Thus, PCB can be decomposed efficiently.

The safety valve 71 provided on the primary reactor 62 deals with an unexpected abnormal rise in a pressure of the primary reactor 62, and discharges a solution containing PCB, a gas and the like to the discharge tank 68 during operation of the safety valve 71 and prevents them from being discharged into the air. The safety valve 71 automatically operates when an internal pressure of the primary reactor 62 reaches a design pressure thereof. In the present embodiment, a spring safety valve is used for the safety valve 71, and spring force is selected to correspond to a set pressure.

The cyclone 63 is provided on the discharge port of the primary reactor 62, and serves to separate the sodium carbonate having a large particle size which comes out of the primary reactor 62 and to return the sodium carbonate to the lower portion of the primary reactor 62 through the circulating line 80. In this case, the drive gas pipe 73 branches a part of the oxidizing agent supplied to the pipe 72, and supplies the oxidizing agent into the primary reactor 62. The gas fed from the drive gas pipe 73 promotes a flow of the downward treated solution in the circulating line 80 to increase an efficiency of the PCB decomposing reaction. More specifically, a downward flow rate of the circulating line 80 is increased. Consequently, revolving force of the treated solution in the cyclone 63 is increased so that big particles of the sodium carbonate deposited in the primary reactor 62 are efficiently separated and collected into the lower portion of the primary reactor 62.

Figure 3:
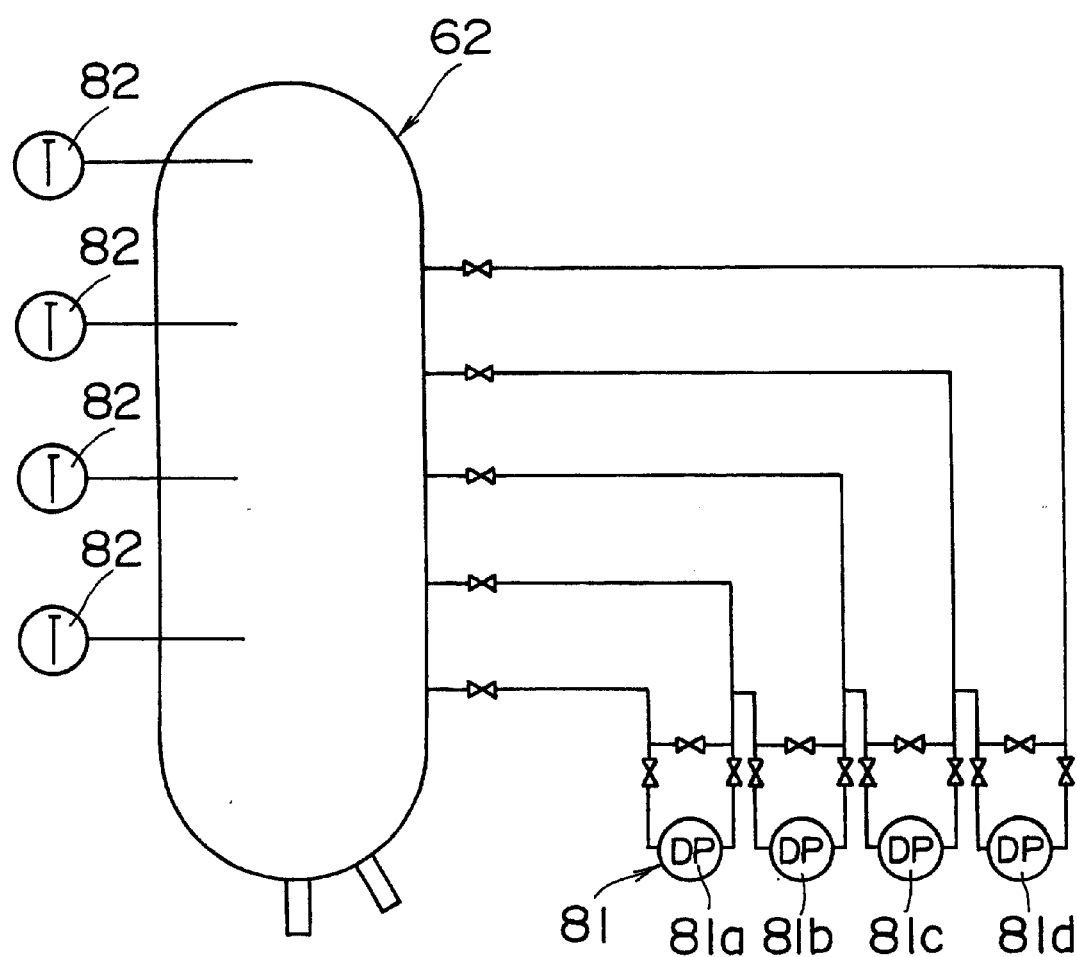
FIG. 3 is an enlarged view showing a primary reactor in FIG. 2.

Whether or not the oxidizing agent or the like is excessively stored in the primary reactor 62 is detected by means of level gauge 81 and thermometer 82 which are provided on the primary reactor 62 as shown in FIG. 3. The level gauge 81 includes differential measuring devices 81a to 81d for dealing with high pressure operation, and thermocouple or the like is used for the thermometer 82. Since the PCB decomposing reaction is not caused on a gas layer, a temperature is reduced in the gas layer more than in a liquid layer. Therefore, the extent of storage of the oxidizing agent can be known.

Unreacted PCB and deposited sodium carbonate in the primary reactor 62 are led to the secondary reactor 64. The secondary reactor 64 causes reaction of the unreacted PCB in the primary reactor 62 and fine particles of the sodium carbonate which has not been separated in the cyclone 63. The cooler 65 lowers a temperature of the treated solution kept at a high temperature until the secondary reactor 64 is reacted, thereby redissolving, in the treated solution, excessive sodium carbonate particles which have not been used for the PCB decomposition in the secondary reactor 64.

The gas which is fed into the discharge tank 68 and has a pressure reduced to an atmospheric pressure by the pressure control valve 67 contains $CO_2$ generated by the PCB decomposition and the excessive oxidizing agent, and flows into the adsorbing vessel 69 as it is. The fluid flowing out of the safety valve 71 contains a gas component (mainly, the excessive oxidizing agent) and the treated solution. The gas component flows into the adsorbing vessel 69 as it is. A part of the treated solution is evaporated and flows into the adsorbing vessel 69, and the residual treated solution is stored in the discharge tank 68.

If it is decided that the excessive oxidizing agent or the like is stored in a top portion of the primary reactor 62 on normal working conditions, pressure control valve 84 operates. In a case where the oxidizing agent which does not contribute to reaction (oxygen and a nitrogen gas if air is used) is stored in the upper portion of the primary reactor 62 to impede mixing and fluidization of the treated solution and oxidizing agent in the reactor 62 and to hinder the PCB decomposition, the pressure control valve 84 causes these gases to flow into the discharge tank 68. Accordingly, the extracted oxidizing agent is sometimes accompanied by a little treated solution. However, venting is basically performed.

The above-mentioned safety valve 71 eliminates an abnormal rise in the internal pressure of the reactor so that not only the gas but also the treated solution is discharged. Thus, the discharged fluid cannot be controlled.

The treated solution whose pressure has not been reduced by the pressure control valve 84 contains an excessive oxidizing agent as a gas, carbon dioxide as a reaction product, NaCl as a reaction product and unreacted sodium carbonate which are dissolved in water at a high pressure of 250 to 300 ata and a high temperature of about 250° C. or less depending on working conditions. When a pressure of the gas-liquid mixed fluid is reduced to the atmospheric pressure, the gas component is separated as it is.

Thus, the discharge tank 68 introduces the treated solution which has been subjected to the PCB decomposition, the oxidizing agent discharged from the pressure control valve 84, and the fluid discharged from the safety valve 71, and separates gas and steam components from the treated water having NaCl dissolved therein. A part of moisture is evaporated in a state obtained before pressure reduction, and is separated as steam and is caused to flow into the adsorbing vessel 69 together with the gas component. Since the residual moisture has sodium carbonate and NaCl dissolved therein and is stored in the bottom portion of the discharge tank 68, it is caused to flow out of this portion into the drainage concentrator 74.

Figure 4:
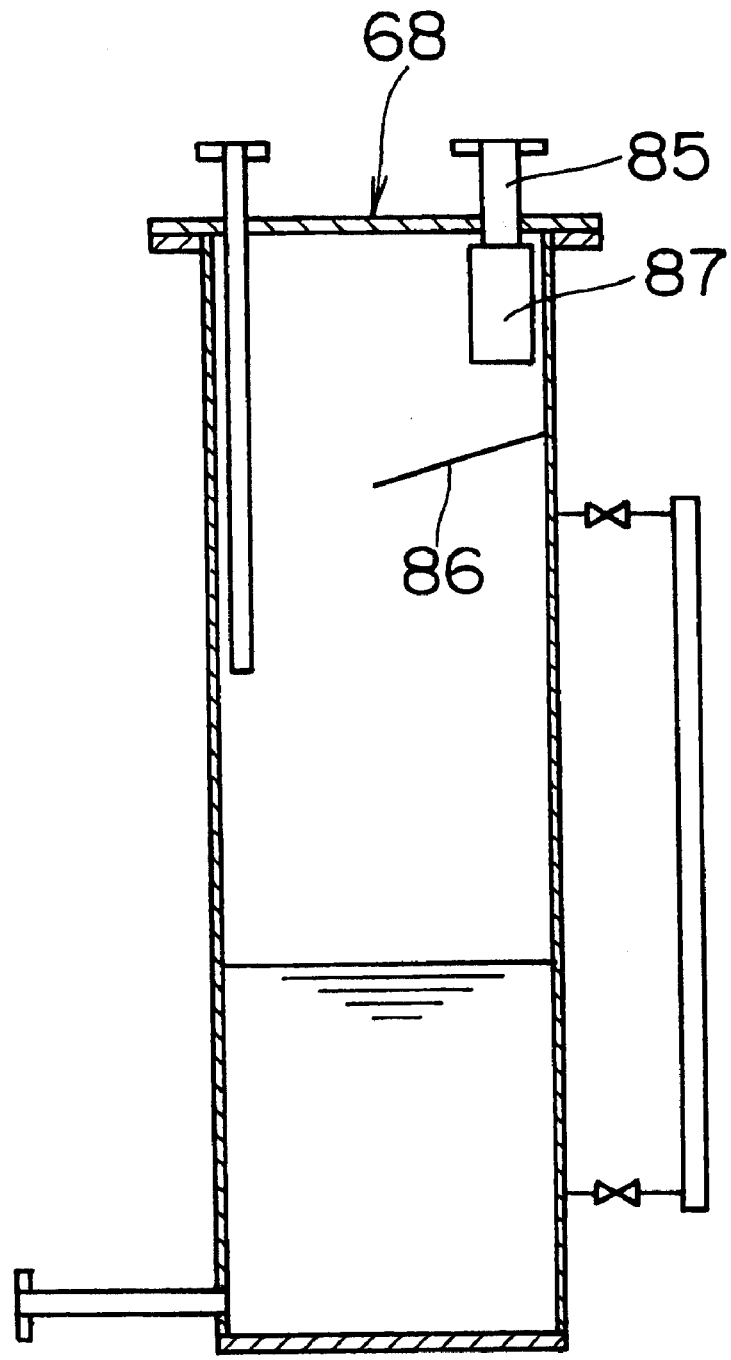
FIG. 4 is an enlarged view showing a discharge tank in FIG. 2.

Consequently, gas-liquid separation in the discharge tank 68 is basically gravity separation in which gas and steam components are caused to flow from a pipe provided in the upper portion of the tank 68 to the adsorbing vessel 69. The discharge tank 68 having a capacity enough for an amount of the entering gas and liquid does not need a special separating mechanism. In order to prevent a gas and steam flow into the adsorbing vessel 69 from being accompanied by moisture, baffle plate 86 and demister (moisture removing device) 87 are provided on output piping section 85 of the discharge tank 68 as shown in FIG. 4.

An active carbon layer is provided on the adsorbing vessel 69 to adsorb undecomposed PCB. The separated gas and steam components are discharged from the exhaust tower 70 through the adsorbing vessel 69.

The adsorbing vessel 69 prevents undecomposition of PCB from being caused by some trouble in the PCB decomposing apparatus, and inhibits the gas and steam flows to be discharged to the air from being accompanied by the PCB. The PCB which might be contained in the gas and steam to be discharged to the air is adsorbed through an adsorbing agent. Examples of the adsorbing agent include active carbon, zeolite, charcoal and the like.

The treated water having NaCl dissolved in the discharge tank 68 is led to the drainage concentrator 74. The drainage concentrator 74 heats and evaporates the treated water by means of the heat source 75, and discharges a drainage having NaCl concentrated into the treated solution tank 76 for storage. The steam evaporated by the drainage concentrator 74 is cooled again by means of the cooler 77, and is stored as condensed water in the collected water tank 78. The water is returned to the water tank 53 through the return water pipe 79 if necessary.

As described above, the PCB decomposition according to the present invention has principle in which PCB mixed with water is pressurized to a predetermined pressure and is heated, and is then introduced into the container-shaped primary reactor, and aqueous sodium carbonate solution for the PCB decomposition and an oxidizing agent such as air or oxygen are blown into the primary reactor, thereby causing the deposited sodium carbonate to react to the PCB at a predetermined high temperature and pressure.

Consequently, the PCB is decomposed into biphenyl containing no chlorine and NaCl. Furthermore, the biphenyl is caused to react to the oxidizing agent and is decomposed into carbon dioxide and water.

A structure of a PCB decomposing apparatus according to a third embodiment of the present invention will be described below with reference to FIG. 5.

Figure 5:
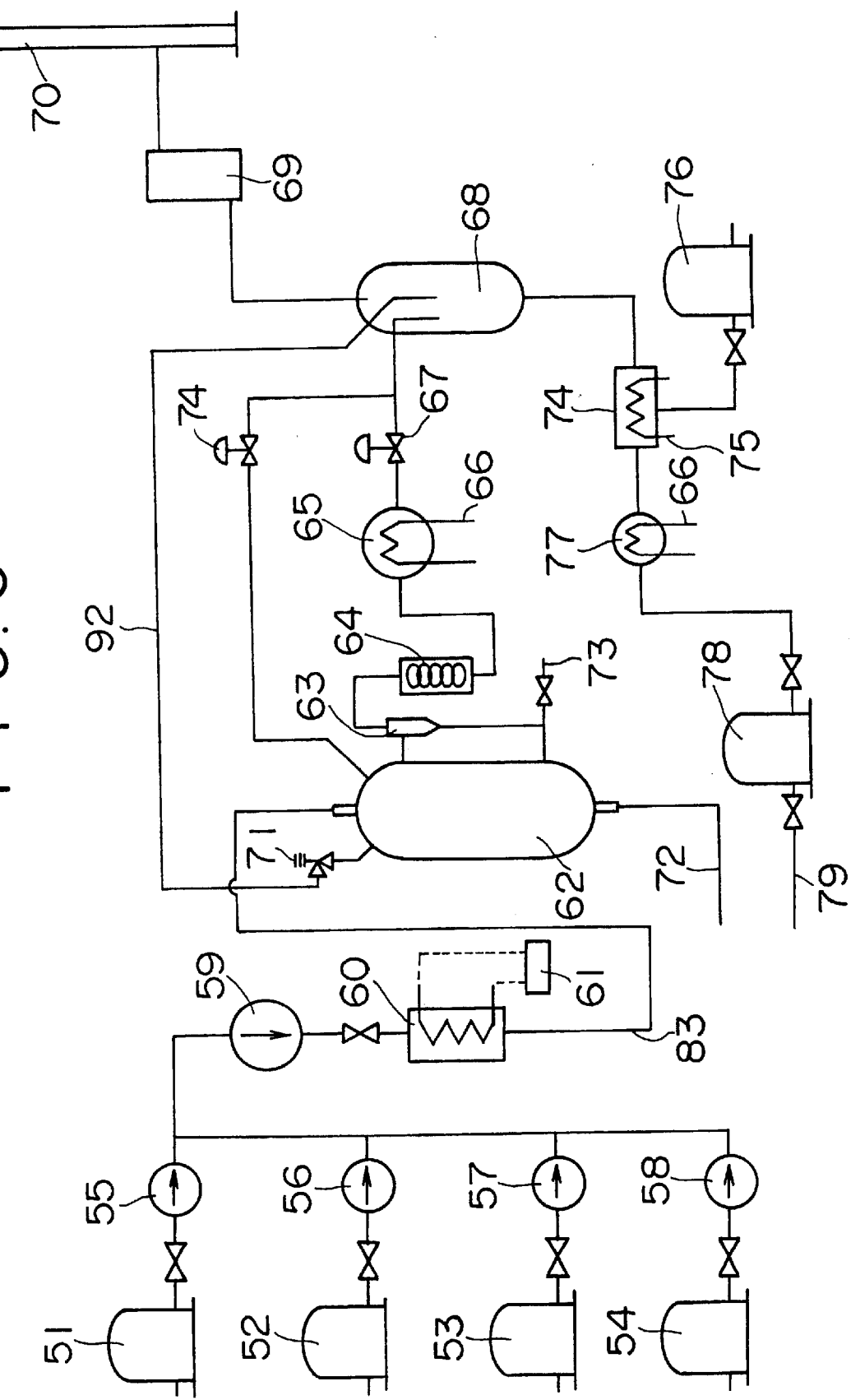
FIG. 5 is a system diagram showing a PCB decomposing apparatus according to a third embodiment of the present invention.

As shown in FIG. 5, the present embodiment is different from the second embodiment in that treated solution supply pipe 83 is provided in an upper portion of primary reactor 62 on the downstream side of start-up heater 60.

Consequently, a PCB treated solution is jetted downward through an upper nozzle of the primary reactor 62 to come in contact with an oxidizing agent jetted upward from a lower portion of the primary reactor 62. Thus, PCB decomposition can be promoted.

Figure 6:
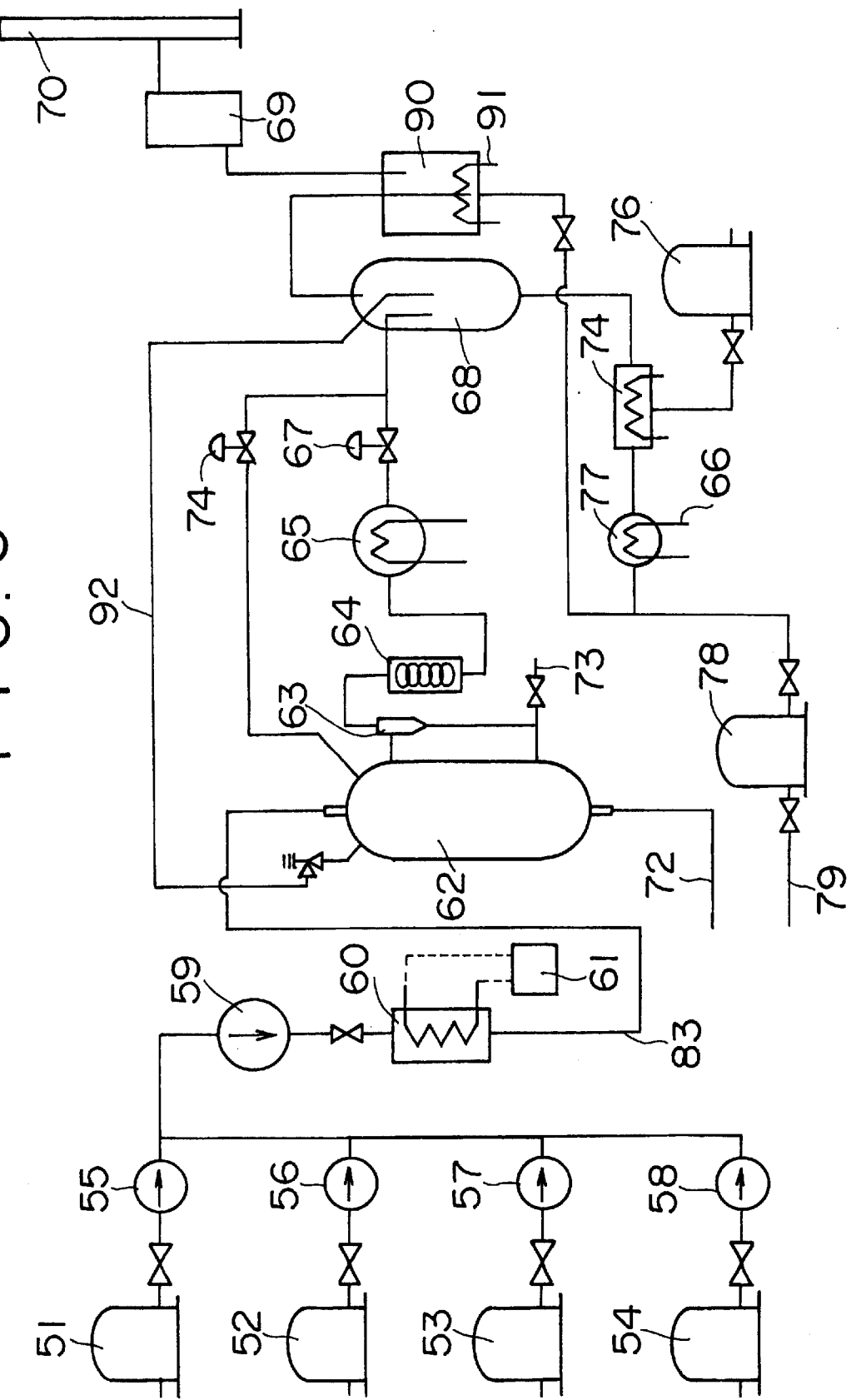
FIG. 6 is a system diagram showing a PCB decomposing apparatus according to a fourth embodiment of the present invention.

A structure of a PCB decomposing apparatus according to a fourth embodiment of the present invention will be described below with reference to FIG. 6.

The present embodiment is different from the third embodiment in that bubble tower 90 is provided on a gas steam system discharged from the PCB decomposing apparatus into the air to further enhance the function of an exhaust gas system. More specifically, the bubble tower 90 is provided on the downstream of discharge tank 68, and is connected to adsorbing vessel 69 and collected water tank 78 through a conduit. The bubble tower 90 has holding water cooled by cooling water 91. Steam to be introduced into the holding water is condensed and returned to the collected water tank 78 for utilization. Only a gas component having moisture removed is led to the adsorbing vessel 69. Therefore, the function of active carbon can be kept.

A structure of a PCB decomposing apparatus according to a fifth embodiment of the present invention will be described below.

The PCB decomposing apparatus described in the first to fourth embodiments has a drawback that more PCB remains on an outlet of a primary reactor if a PCB concentration or throughput in a supplied solution is increased. If the PCB remains on the outlet of the primary reactor, a load of a secondary reactor is increased. Depending on circumstances, there is a possibility that the PCB might remain on the outlet of the secondary reactor.

As a result of investigations, the following two reasons have become clear.

(1) Reaction for making PCB innoxious causes hydroxyl ions (OH$^-$) to be consumed as expressed in the following formula.

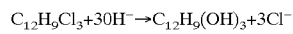

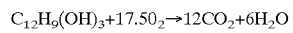

(Deposited $Na_2CO_3$ performs catalytic action)

(2) Dissolved sodium carbonate produces hydroxyl ions expressed in the following formula:

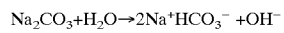

It has been known that a solubility of the sodium carbonate is reduced if a temperature is increased. However, it has been found that a redissolution rate of the deposited sodium carbonate is much lower than a reaction rate of (1) and the hydroxyl ions to be consumed by reaction for PCB making innoxious cannot be supplemented.

Based on the above-mentioned knowledge, the following means was used in the fifth embodiment.

(a) An alkali hydroxide compound such as sodium hydroxide is added into a solution containing sodium carbonate to be supplied to the primary reactor.

(b) An alkali hydroxide compound such as sodium hydroxide is added into a solution containing sodium carbonate to be supplied to the secondary reactor.

(c) The alkali hydroxide compound to be supplied to each reactor is added in such a manner that pH of a solution sampled from the reactor is greater than 10.

A structure according to the present embodiment using the above mentioned means (a) and (c) will be described below with reference to the drawings.

Figure 7:
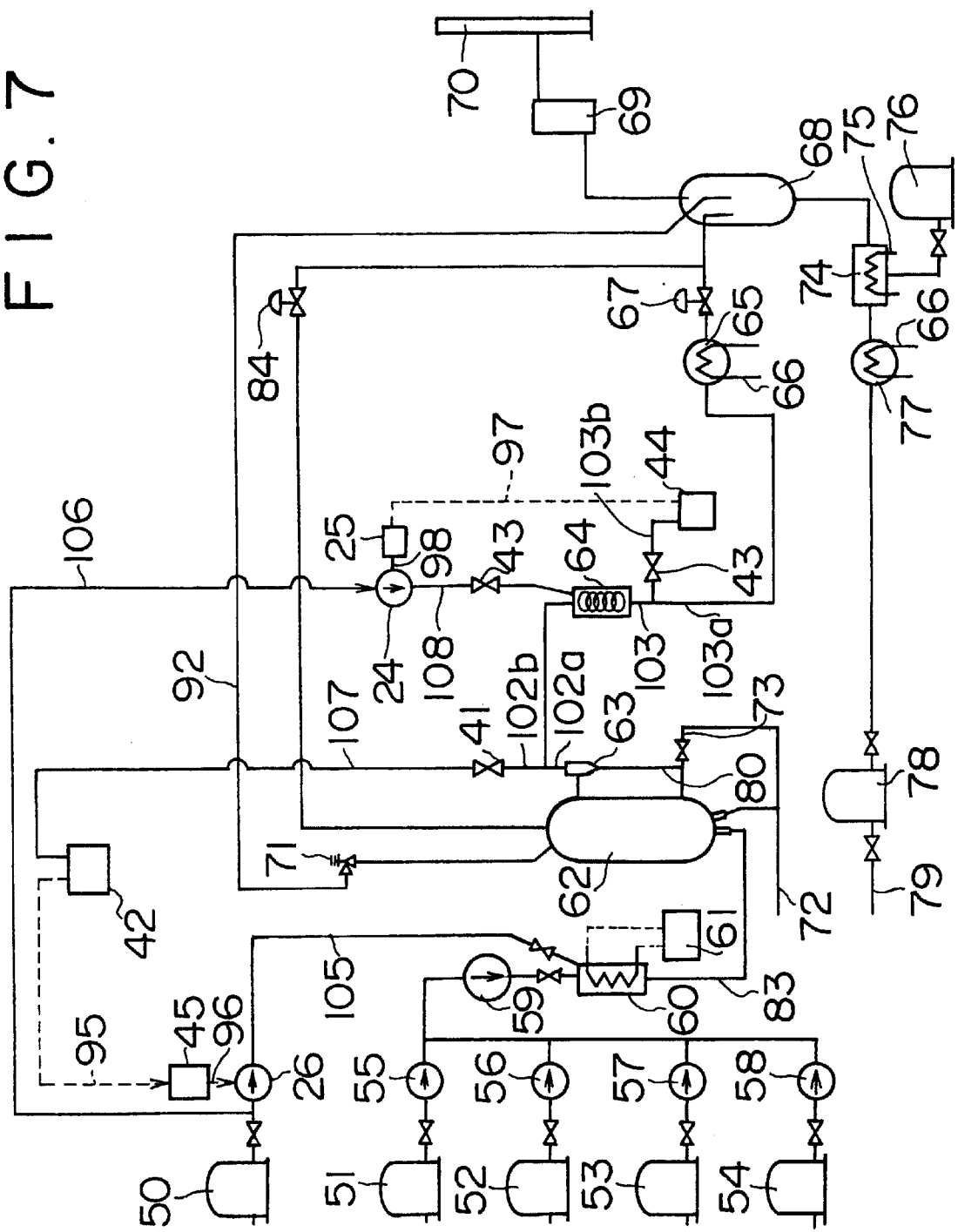
FIG. 7 is a system diagram showing a PCB decomposing apparatus according to a fifth embodiment of the present invention.

A PCB decomposing apparatus shown in FIG. 7 is formed with means for supplying sodium hydroxide and means for controlling an amount of supply provided on the primary reactor 62 and the secondary reactor 64 of the PCB decomposing apparatus according to the second embodiment shown in FIG. 2.

More specifically, the PCB decomposing apparatus is provided with sodium hydroxide solution tank 50. The solution tank 50 is connected through pipe 105 to start-up heater 60 provided on the upstream side of the primary reactor 62, and is connected to the secondary reactor 64 through branched pipe 106.

The pipe 105 is provided with pump 26 and controller 45 for regulating an amount of a sodium hydroxide solution to be supplied. The controller 45 includes pH measuring device 42 to connect pipe 107 for sampling a pH detecting solution to cyclone 63 through valve 41.

The pipe 106 is provided with pump 24 and controller 25 for regulating an amount of the sodium hydroxide solution to be supplied. The controller 25 includes pH measuring device 44 to be connected to the downstream side of the secondary reactor 64 through valve 43 for collecting solution 103b for pH sampling.

The function of the fifth embodiment will be described below.

In the PCB decomposing apparatus shown in FIG. 7, an organic compound containing a chlorine group such as PCB is discharged from PCB treating tank 51, a solution saturated or oversaturated with sodium carbonate, water and a solvent are discharged from tanks 52 to 54, they are pressurized by means of transfer pump 59 and are supplied to the primary reactor 62 from a lower portion. In addition, oxygen or an oxidizing agent such as aqueous hydrogen peroxide solution capable of generating the oxygen is supplied to the lower portion of the primary reactor 62 through supply pipe 72.

The primary reactor 62 generates heat by reaction of a part of the oxygen and the organic compound and solvent, but keeps a temperature of 360 to 390° C. A pressure of the reactor is regulated to 220 to 250 kg/cm$^2$ by means of pressure control valve 67. Pressurized water is contained in the reactor at the above-mentioned temperature and pressure. Thus, reaction for PCB making innoxious proceeds.

The reacted liquid contains carbon dioxide, salt, unreacted oxygen, and dissolved and reacted sodium carbonate, and is fed to the cyclone 63. About 90 to 98 wt % of the sodium carbonate which is a suspension particle contained in the liquid is collected into the cyclone 63, and is returned to the primary reactor 62. While liquid 102a discharged from the cyclone 63 is fed to the secondary reactor 64, a part of liquid 102b is sampled through valve 41 and pH is measured by the pH measuring device 42.

A measured value is changed into electric signal 95 by the pH measuring device 42, and is fed to the controller 45 for supplying a sodium hydroxide solution. The controller 45 receives the electric signal 95, and performs control to increase a supply rate of the sodium hydroxide solution if pH is smaller than 10.

The secondary reactor 64 is provided for complete reaction of PCB slipping through the primary reactor 62. Accordingly, a pH value is set greater than 10 also in the secondary reactor 64 so as to cause the PCB to fully react. Consequently, the pH measuring device 44 measures pH of solution 103b which is partially sampled from the secondary reactor 64 through the valve 43, converts the pH into electric signal 97 and sends the electric signal 97 to the controller 25. A liquid obtained by completely removing the PCB in the secondary reactor 64 is treated in the same manner as in the first to fourth embodiments.

In the above-mentioned embodiment, the sodium carbonate deposited at a high temperature has a low redissolution rate. Therefore, in a case where a treating concentration of a chlorine containing organic compound such as PCB is high, there is a possibility that hydroxyl ions (OH$^-$) of a reactant might become insufficient and the chlorine containing organic compound such as PCB might remain.

According to the present embodiment, the PCB has a high solubility also at a high temperature, for example, of 360 to 390° C., and hydroxyl ions can easily be supplied as shown by the dissolving reaction of the following equation:

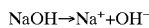

$$NaOH \rightarrow Na^+ + OH^-$$

An alkali hydroxide compound such as sodium hydroxide is supplied to the reactor. Consequently, the hydroxyl ions to be consumed by the reaction for PCB making innoxious are supplemented.

By supplying the alkali hydroxide compound such as sodium hydroxide, it was possible to keep a value greater than pH 10 for optimizing reaction in the reactors 62 and 64 simultaneously. Consequently, the chlorine containing organic compound such as PCB remaining on outlets of the reactors 62 and 64 was removed.

Figure 8:
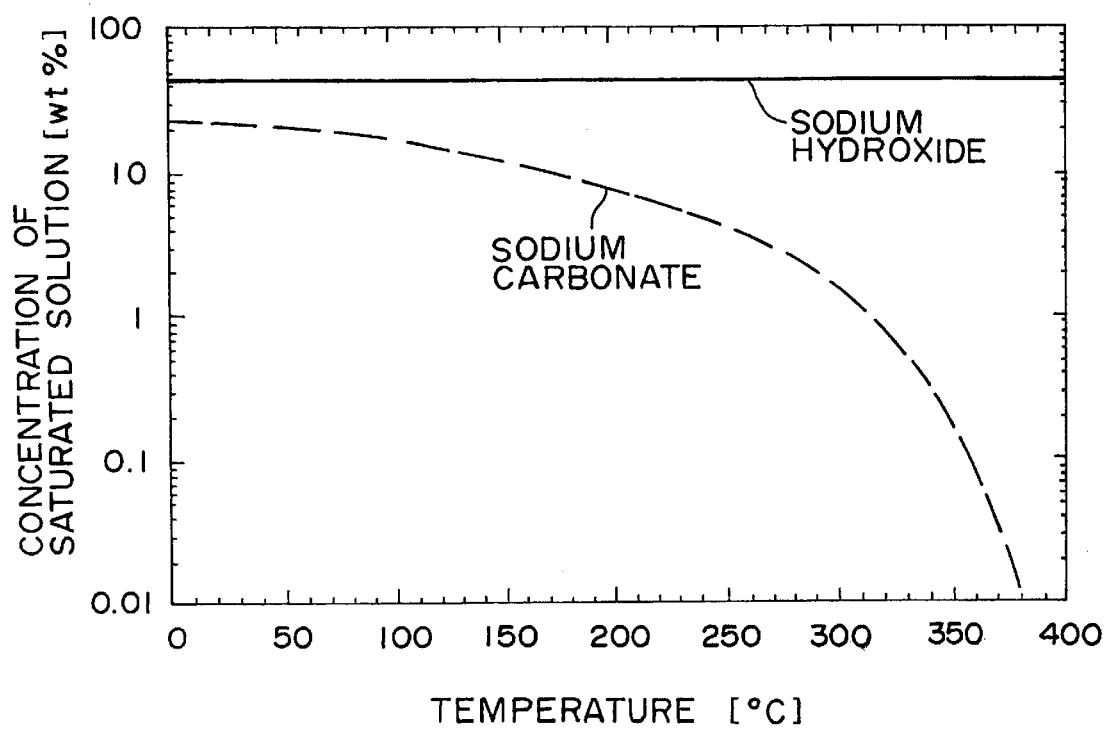
FIG. 8 is a chart showing influence of a temperature on a solubility of each of sodium carbonate and sodium hydroxide according to the fifth embodiment of the present invention.

FIG. 8 shows a solubility of each of sodium carbonate and sodium hydroxide to a temperature. As shown in FIG. 8, if the temperature is increased, the solubility of the sodium carbonate is reduced. For this reason, pH of the single sodium carbonate is reduced (a hydroxyl ion concentration of a reactant is reduced). However, pH can be increased (the hydroxyl ion concentration of the reactant can be increased) by regulating an amount of sodium hydroxide to be added as in the present embodiment.

Figure 9:
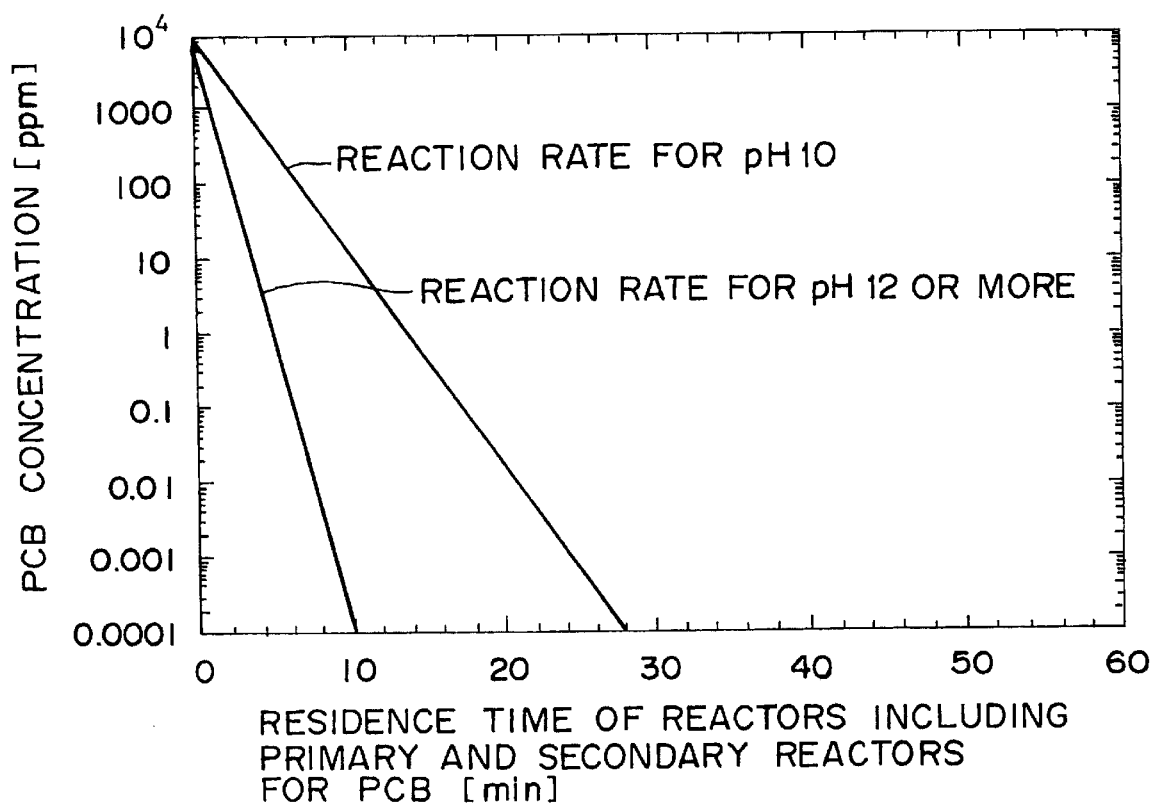
FIG. 9 is a chart showing a relationship between a reaction rate for PCB making innoxious and pH according to the fifth embodiment of the present invention.

FIG. 9 shows a relationship between pH and a reaction rate for PCB making innoxious which is obtained by an analysis of a PCB residual concentration given by gas chromatography (a method disclosed in "Table 5 of Notification No. 59 of the Environment Agency" in 1971). It is apparent from FIG. 9 that the reaction rate for PCB making innoxious is increased if pH exceeds 10.

While the preferred embodiments of the present invention have been described above, the present invention is not restricted thereto but various modifications can be performed on the basis of technological thought of the present invention.

While a pressure of the pressure pump 13 has been set to 220 ata in the first embodiment, for example, a preferred pressure is 200 to 300 ata. While a treatment temperature has been set to 380° C. in the primary reactor 160, a preferred temperature is 350 to 400° C.

According to the present invention described above, Na$_2$CO$_3$ is injected into the primary reactor. Therefore, the Na$_2$CO$_3$ is mixed with water heated in the primary reactor so that a temperature is raised. Consequently, Na$_2$CO$_3$ crystals are deposited. Thus, it can be possible to prevent crystals from being conventionally deposited on a heating surface (an internal wall) of a pipe. The circulating water and the oxidizing agent are jetted from the nozzle. Consequently, the fluid contained in the primary reactor is stirred. The deposited Na$_2$CO$_3$ crystals and PCB are mixed so that solid-liquid contact is promoted. Thus, a PCB concentration can be reduced to an order of ppm in the primary reactor.

In the secondary reactor, the pcb concentration can be reduced to an order of ppb by further increasing a residence time of a fluid containing pcb.

What is claimed is:

1. A PCB decomposing method comprising the steps of:
    pressurizing PCB mixed with water to a pressure between 200 to 300 atmospheres and heating the mixture;
    then introducing the mixture into a primary reactor;
    introducing aqueous Na$_2$CO$_3$ solution for PCB decomposition into said primary reactor forming deposited Na$_2$CO$_3$ therein and blowing an oxidizing agent through a nozzle into the primary reactor to mix the deposited Na$_2$CO$_3$ with the PCB;
    decomposing the PCB into biphenyl containing no chlorine and NaCl;
    causing the biphenyl to react with the oxidizing agent, thereby decomposing the biphenyl into carbon dioxide and water; and
    causing a fluid containing unreacted PCB to flow into piping in a secondary reactor, so as to extend a residence time of the fluid in the secondary reactor for increasing a reaction time for decomposition of the PCB, wherein the unreacted PCB flowing from the primary reactor and the deposited sodium carbonate are separated from each other, and the separated sodium carbonate is returned to the primary reactor.

2. The PCB decomposing method according to claim 1, wherein the flowing unreacted PCB and the deposited sodium carbonate are separated from each other by means of a cyclone separator, and the cyclone separator is caused to communicate with an oxidizing agent supply path to the primary reactor to promote separation in the cyclone separator by a flow of the oxidizing agent and return of the separated sodium carbonate to the primary reactor.

3. The PCB decomposing method according to claim 2, wherein pH in the primary reactor and/or the secondary reactor is measured, and the measured pH is used to control a supply of sodium hydroxide into the reactors to maintain the pH in the reactors at or above a pH of 10.

4. The PCB decomposing method according to claim 1, wherein a treated solution flowing out of the secondary reactor, a fluid flowing out of the primary reactor for dropping the pressure inside the primary reactor, or an oxidizing agent is separated into a gas and a liquid, and PCB is adsorbed from the separated gas to be discharged.

5. The PCB decomposing method according to claim 4, wherein the separated liquid is further separated into steam and a concentrated solution, and the separated steam is cooled and recycled as water.

6. The PCB decomposing method according to claim 1, wherein pH in the primary reactor and/or the secondary reactor is measured, and the measured pH is used to control a supply of sodium hydroxide into the reactors to maintain the pH in the reactors at or above a pH of 10.

7. A PCB decomposing method comprising the steps of:
reacting a mixture of PCB and water with $Na_2CO_3$ and an oxidizing agent in a primary reactor;
measuring pH of the contents of the primary reactor; and
maintaining the pH of the contents of the primary reactor at or above a pH of 10 based on the measured pH by adding sodium hydroxide to the primary reactor.

8. The PCB decomposing method according to claim 7, wherein the measuring step comprises:
sampling a portion of an outlet stream from the primary reactor;
providing the sample to a pH measuring device; and
generating an electrical signal in the pH measuring device that corresponds to the measured pH.

9. The PCB decomposing method according to claim 8, wherein the maintaining step comprises:
controlling the addition of sodium hydroxide to the primary reactor based on the electrical signal generated in the pH measuring device.

10. A PCB decomposing method comprising the steps of:
reacting a mixture of PCB and water with $Na_2CO_3$ and an oxidizing agent in a primary reactor;
causing a fluid containing unreacted PCB to flow into piping in a secondary reactor, so as to extend a residence time of the fluid in the secondary reactor for increasing a reaction time for decomposition of the PCB;
measuring pH of the contents of the secondary reactor; and
maintaining the pH of the contents of the secondary reactor at or above a pH of 10 based on the measured pH by adding sodium hydroxide to the secondary reactor.

11. The PCB decomposing method according to claim 10, wherein the measuring step comprises:
sampling a portion of an outlet stream from the secondary reactor;
providing the sample to a pH measuring device; and
generating an electrical signal in the pH measuring device that corresponds to the measured pH.

12. The PCB decomposing method according to claim 11, wherein the maintaining step comprises:
controlling the addition of sodium hydroxide to the secondary reactor based on the electrical signal generated in the pH measuring device.

13. A PCB decomposing method comprising the steps of:
pressurizing PCB mixed with water to a pressure between 200 to 300 atmospheres and heating the mixture;
then introducing the mixture into a primary reactor;
introducing aqueous $Na_2CO_3$ solution for PCB decomposition into said Primary reactor forming deposited $NaCO_3$ therei and blowing an oxidizing agent through a nozzle into the primary reactor to mix the deposited $Na_2CO_3$ with the PCB;
decomposing the PCB into biphenyl containing no chlorine and NaCl;
causing the biphenyl to react with the oxidizing agent, thereby decomposing the biphenyl into carbon dioxide and water; and
separating unreacted PCB flowing from the primary reactor and the deposited sodium carbonate from each other by means of a cyclone separator to form separated sodium carbonate and a fluid containing unreacted PCB, wherein the cyclone separator is caused to communicate with an oxidizing agent supply path to the primary reactor to promote separation in the cyclone separator by a flow of the oxidizing agent;
returning the separated sodium carbonate to the primary reactor;
causing the fluid containing unreacted PCB to flow into a piping in a secondary reactor, so as to extend a residence time of the fluid in the secondary reactor for increasing a reaction time for decomposition of the PCB;
measuring the pH in the primary reactor and/or the secondary reactor; and
utilizing the measured pH to control a supply of sodium hydroxide into the primary reactor and/or the secondary reactor to maintain the pH in the primary and/or the secondary reactor at or above a pH of 10.

* * * * *

UNITED STATES PATENT AND TRADEMARK OFFICE
CERTIFICATE OF CORRECTION

PATENT NO.    : 6,235,963 B1
DATED         : May 22, 2001
INVENTOR(S)   : Yamauchi et al.

It is certified that error appears in the above-identified patent and that said Letters Patent is hereby corrected as shown below:

Column 14,
Line 26, should read -- position into said primary reactor forming deposited --
Line 27, should read -- $NaCO_3$ therein and blowing an oxidizing agent through --

Signed and Sealed this

Twenty-fourth Day of December, 2002

JAMES E. ROGAN
*Director of the United States Patent and Trademark Office*